United States Patent
Nakamura et al.

(10) Patent No.: US 9,927,613 B2
(45) Date of Patent: Mar. 27, 2018

(54) IMAGE DISPLAY APPARATUS AND HEAD MOUNTED DISPLAY

(71) Applicant: Hitachi-LG Data Storage, Inc., Tokyo (JP)

(72) Inventors: Toshiteru Nakamura, Tokyo (JP); Satoshi Ouchi, Tokyo (JP); Yoshiho Seo, Tokyo (JP); Tomoto Kawamura, Tokyo (JP); Yoshio Okamoto, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 174 days.

(21) Appl. No.: 14/936,975

(22) Filed: Nov. 10, 2015

(65) Prior Publication Data
US 2016/0131909 A1    May 12, 2016

(30) Foreign Application Priority Data

Nov. 10, 2014  (JP) ................. 2014-227659

(51) Int. Cl.
*G02B 27/01*   (2006.01)
*F21V 8/00*    (2006.01)
*G02B 27/09*   (2006.01)

(52) U.S. Cl.
CPC ....... *G02B 27/0172* (2013.01); *G02B 6/0041* (2013.01); *G02B 27/0994* (2013.01); *G02B 2027/0118* (2013.01); *G02B 2027/0138* (2013.01)

(58) Field of Classification Search
None
See application file for complete search history.

(56) References Cited

U.S. PATENT DOCUMENTS

| 2010/0214635 | A1* | 8/2010 | Sasaki ............... G02B 27/0101 359/15 |
| 2012/0081800 | A1* | 4/2012 | Cheng ................... G03B 21/00 359/720 |
| 2013/0208004 | A1* | 8/2013 | Hamada ............... G06T 19/006 345/633 |

FOREIGN PATENT DOCUMENTS

| CN | 202433603 U | 9/2012 |
| JP | 2006-003879 A | 1/2006 |

OTHER PUBLICATIONS

Chinese Office Action received in corresponding Chinese Application No. 201510751890.4 dated Jul. 31, 2017.

* cited by examiner

*Primary Examiner* — Nicholas Lee
(74) *Attorney, Agent, or Firm* — Mattingly & Malur, PC

(57) ABSTRACT

An image display apparatus which displays, as a virtual image, image in a visual field of a user, including an image generation section to generate image; an illumination section to illuminate light to the image generation section; and a projection section by which the image generated by the image generation section is projected, as a virtual image, into the visual field of the user, the projection section includes: a prism lens formed by integrating, by predetermined unit, a lens to generate the virtual image, with a prism provided thereon with a half mirror film which bends, in the direction of the pupil, a signal light from the image generation section; and aperture restriction unit which is provided on the incident surface of the prism lens, and which allows light in a predetermined area of the signal light from the image generation section to pass therethrough.

11 Claims, 13 Drawing Sheets

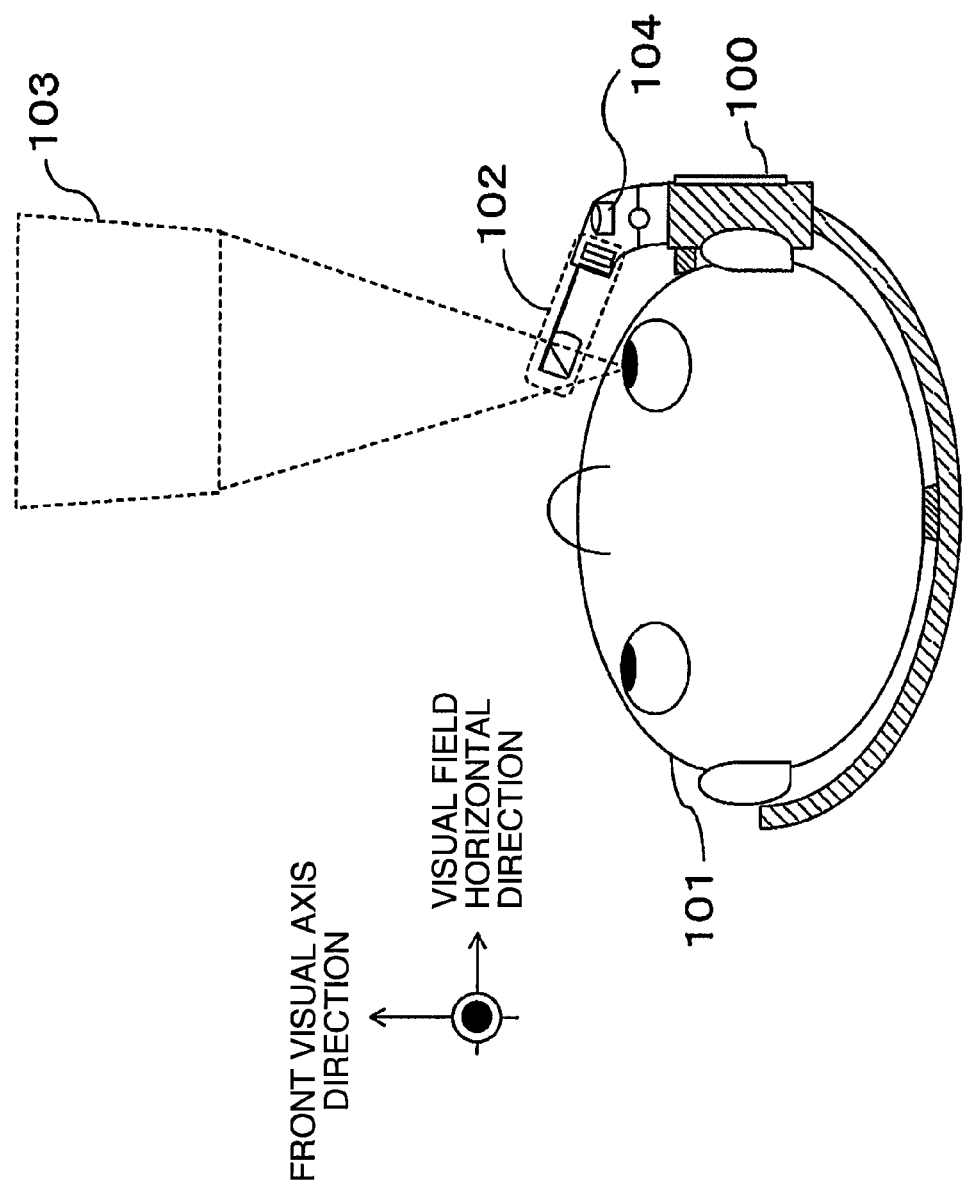

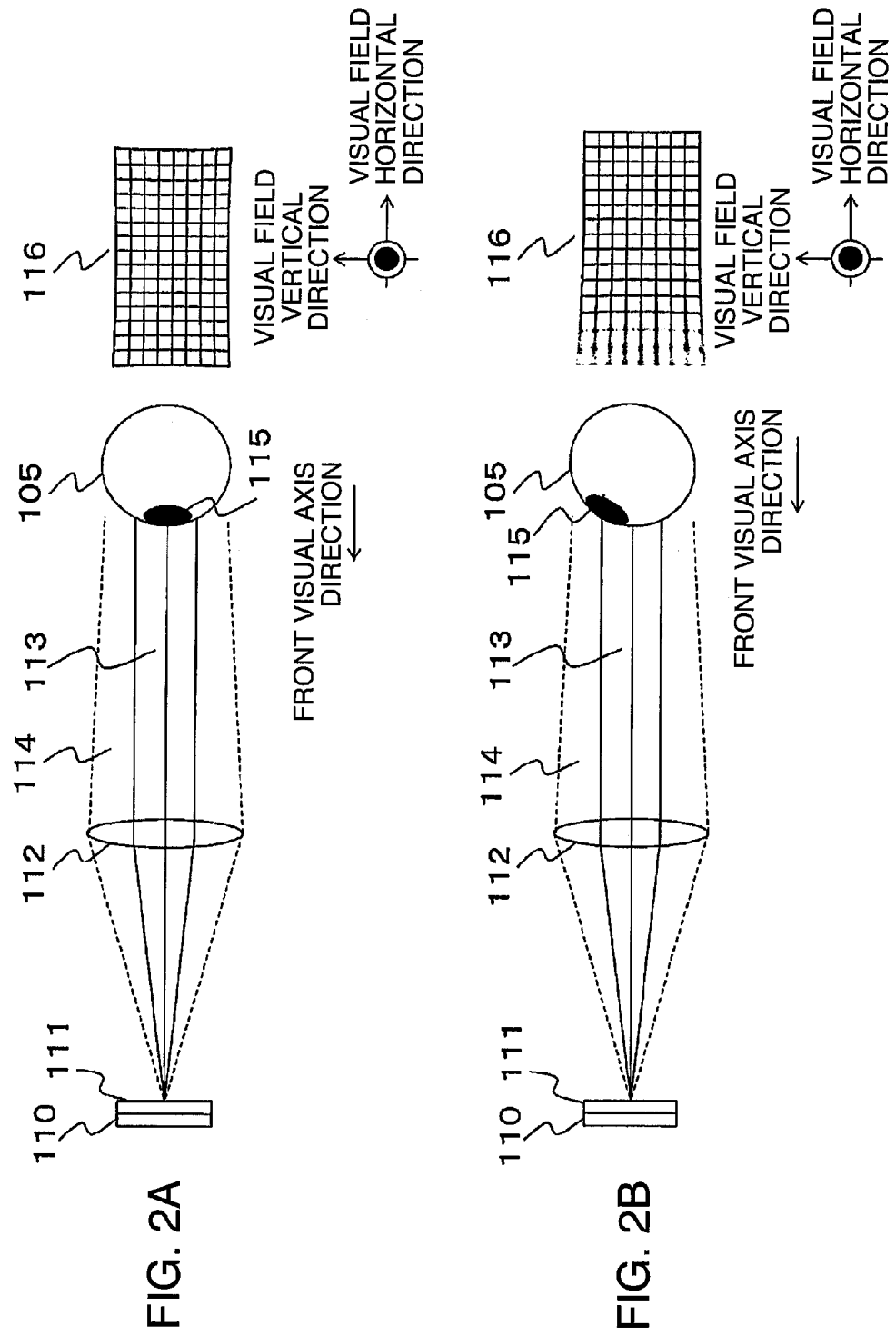

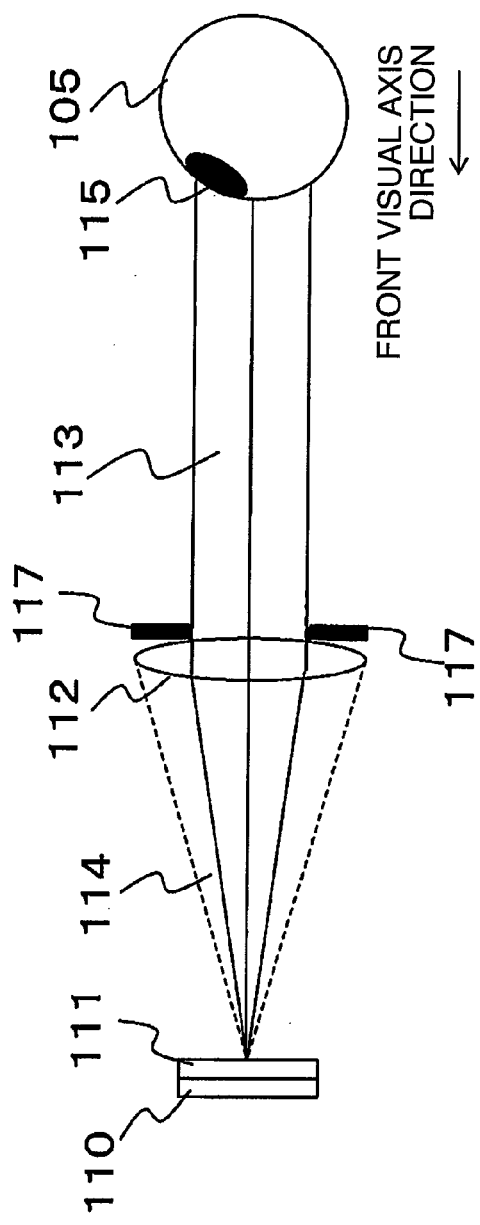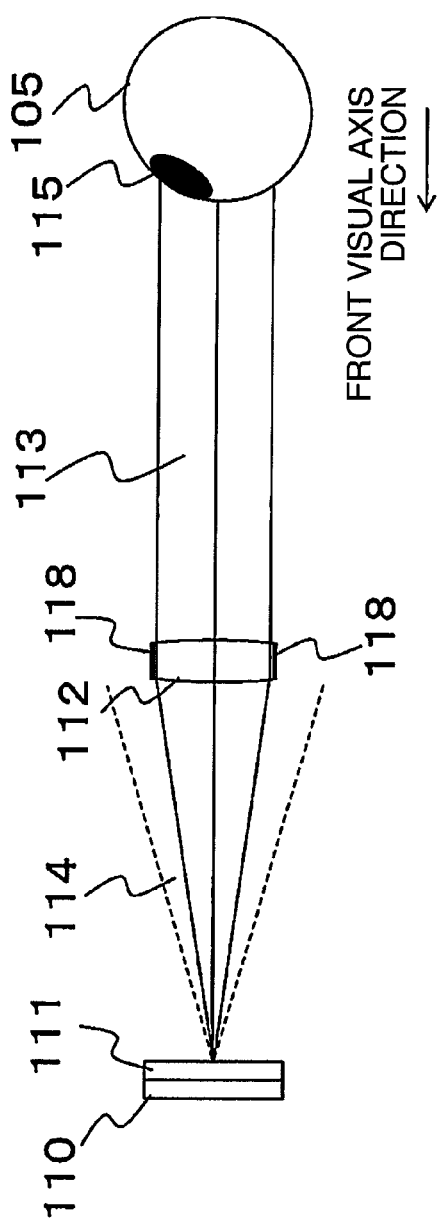
FIG. 3A
FIG. 3B

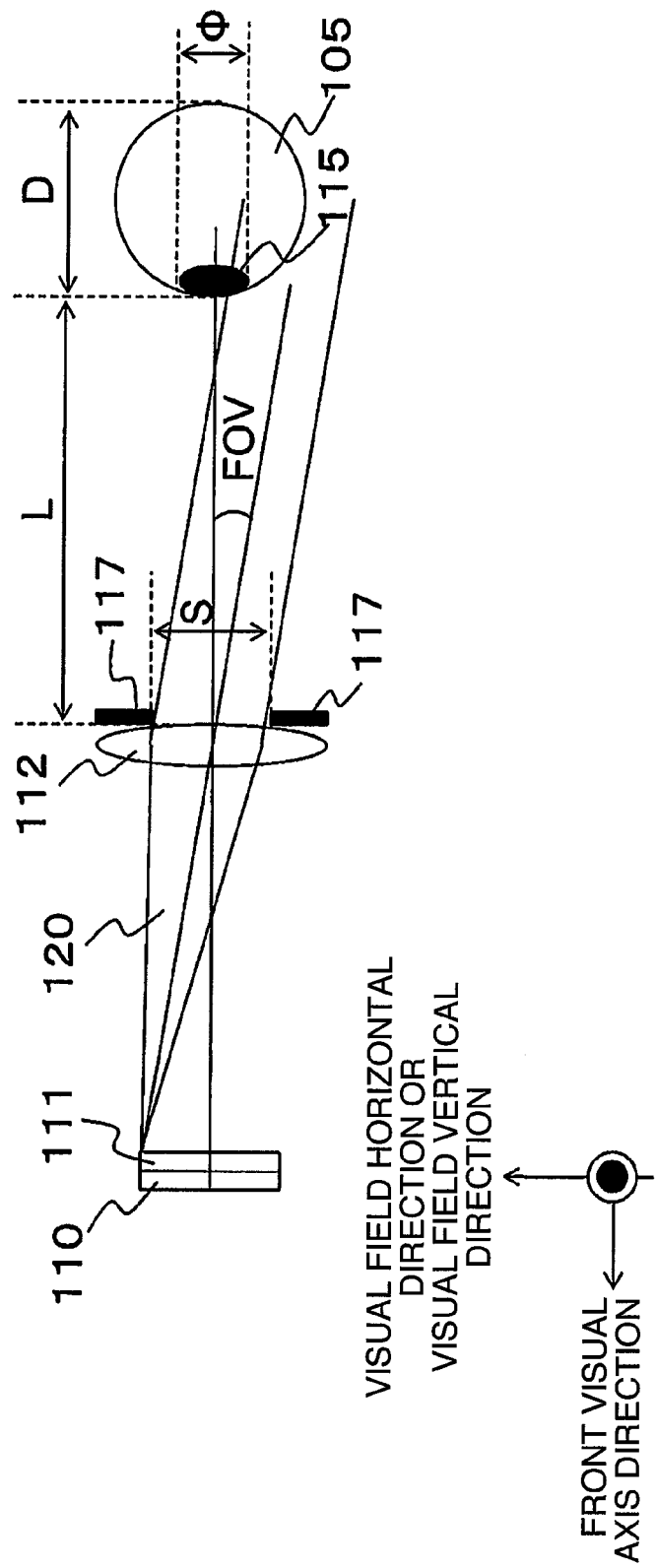

IMAGE DISPLAY APPARATUS AND HEAD MOUNTED DISPLAY

INCORPORATION BY REFERENCE

The present application claims priority from Japanese application JP2014-227659 filed on Nov. 10, 2014, the content of which is hereby incorporated by reference into this application.

BACKGROUND OF THE INVENTION

The present invention relates to a head mounted display which displays an image in a visual field of a user by using an image display apparatus.

There have been proposed various methods related to an optical system configuration of a so-called wearable information display apparatus which displays predetermined information by using a goggle type or glasses type head mounted display.

For example, JP-A-2006-3879 describes a method related to a head-mount type image display apparatus which is compact and lightweight although having see-around and see-through mechanisms and which has a large visual field of the outside world and high luminance of electronic images with a low power consumption.

A head mounted display as a wearable device is assumed to be used in a mounted state in daily life work, maintenance work, and the like. Therefore, it is necessary that the head mounted display have a high see-through function in order not to obstruct the user's visual field, and enable high-quality images to be visually recognized even when the sight line of the user moves during work.

Further, in addition to the see-through function, low power consumption for realizing long-time operation, and miniaturization for enhancing the portability and wearability are important for enhancing the convenience of the user.

For example, JP-A-2006-3879 describes that, when, in the image display apparatus, the width of the projected cross-section of a member, which configures an eyepiece window holding section, and which faces the visual axis direction of the user, is set to 4 mm or less, and when the eyepiece window holding section is made thinner than the average human pupil diameter (4 mm), the image display apparatus can obtain a see-through effect because the visual field for the outside world is not completely blocked by the apparatus even when the apparatus is arranged in the visual field.

However, in this case, there is a problem that, when the width of the projected cross-section in the visual axis direction of the user is set to 4 mm which is the same as the pupil diameter, and when the pupil moves with the sight line movement, signal light is not incident on the pupil, so that the image projected in the visual field is invisible or partly invisible.

SUMMARY OF THE INVENTION

The present invention has been made in view of the above described circumstances. An object of the present invention is to provide a head mounted display in which, in an image projection optical system of the head mounted display, images can be visually recognized with high quality even when the sight line moves, and which is small in size and has a high see-through function.

The above-described object can be achieved by the configuration described, as an example, in the claims. The present invention includes a number of means for solving the above-described problems, but an example of these is an image display apparatus which displays an image in a visual field of a user. The image display apparatus includes: an image generation section which generates an image; an illumination section which illuminates light to the image generation section; and a projection section by which the image generated by the image generation section is projected, as a virtual image, to the visual field of the user. Further, the projection section includes: a prism lens formed by integrating a prism provided thereon a half mirror film by which signal light from the image generation section is bent in the direction of the pupil of the user, with a lens which generates a virtual image; and aperture restriction unit through which light in a predetermined area of the signal light is made to pass.

According to the present invention, it is possible to provide a head mounted display which is provided with the image projection optical system that enables high-quality images to be visually recognized even when the sight line moves, and which is small in size and provided with a see-through function and hence is excellent in convenience.

Other objects, features and advantages of the invention will become apparent from the following description of the embodiments of the invention taken in conjunction with the accompanying drawings.

BRIEF DESCRIPTION OF THE DRAWINGS

FIG. 1 is a schematic view showing a form of a head mounted display in the present invention;

FIGS. 2A and 2B are simplified schematic diagrams of image display unit;

FIGS. 3A and 3B are simplified schematic diagrams of examples of an image display apparatus provided with aperture restriction unit;

FIG. 4 is a simplified schematic diagram showing the image display apparatus provided with the aperture restriction unit, and showing a light beam emitted from the screen edge of the image display apparatus;

DESCRIPTION OF THE EMBODIMENTS

Figure 5:
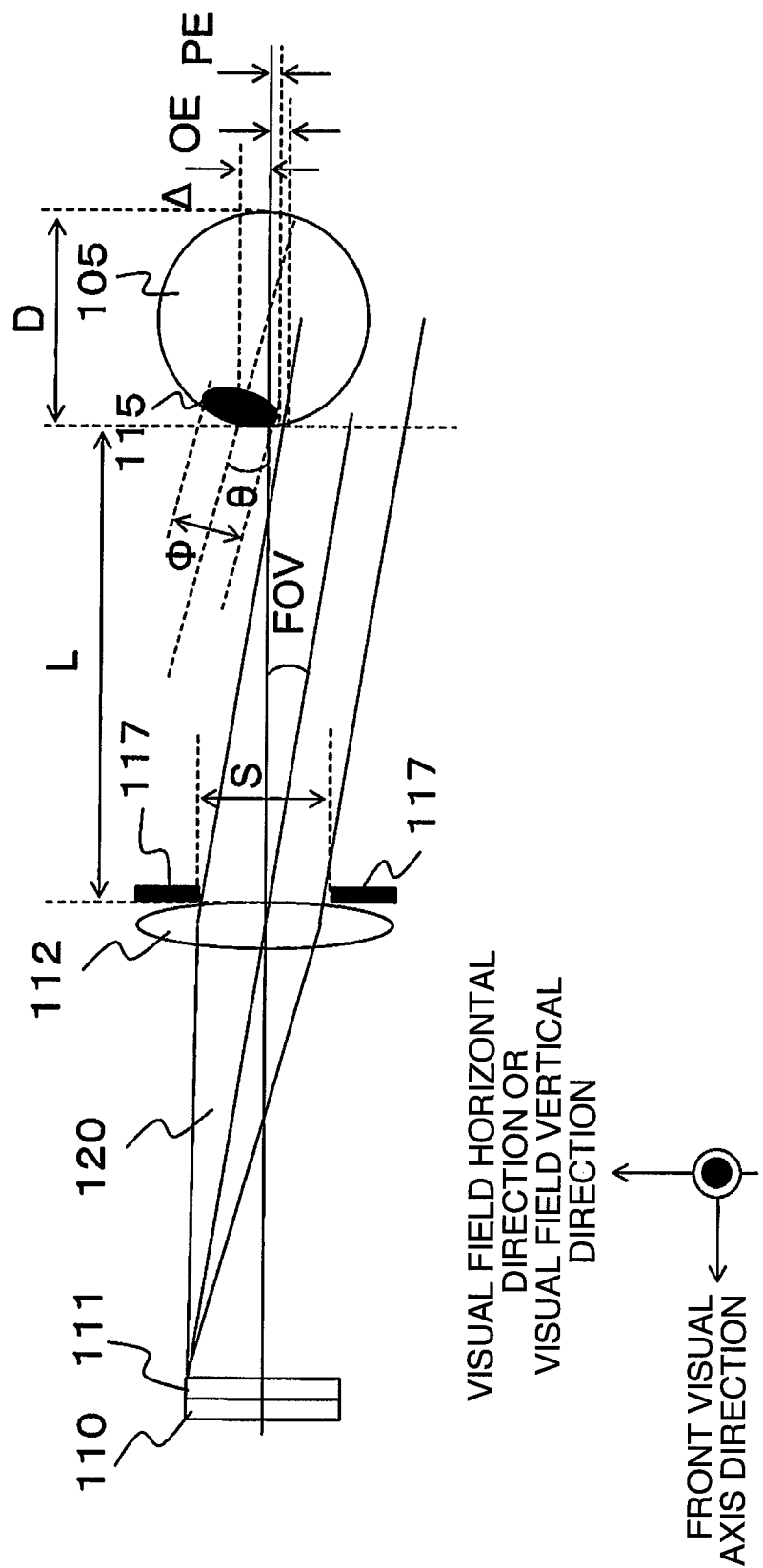
FIG. 5 is a simplified schematic diagram showing the image display apparatus provided with the aperture restriction unit, and showing the light beam emitted from the screen edge of the image display apparatus.

In the following, embodiments according to the present invention will be described with reference to the accompanying drawings.

First Embodiment

Examples of embodiments of an image display apparatus using the present invention and a head mounted display provided with the image display apparatus are described as follows. It should be noted that the present invention is not limited by the following description. Further, the same components in the figures are denoted by the same reference numerals.

FIG. 1 is a schematic view showing a first embodiment of a head mounted display in the present invention.

A head mounted display 100 is a see-through type head mounted display which is mounted on a user's head section 101 and is mounted with an image display apparatus 102 which displays images on a part of a visual field of a user when the user can see the outside world. Images are displayed in an area 103 in the visual field of the user. Further, the head mounted display 100 is mounted with photographing unit 104 which photographs a part of the range of the user's visual field.

For example, it may be configured such that, by predetermined optical unit using a lens, a hologram, an optical fiber, or the like, the image display apparatus 102 transmits, to the inside of the user's visual field, images displayed on a liquid crystal, a digital micro-mirror device, or the like, which is mounted to the head mounted display 100, so that the images are focused on the user's retina so as to be recognized. As the photographing unit, a camera, or the like, may be used.

The head mounted display is expected to be used, in the mounted state, for applications, such as displaying simple information for the user in everyday life, and displaying work instruction in maintenance and inspection work. Therefore, in order that the head mounted display does not obstruct the user's visual field, it is strongly required for the head mounted display that a high see-through function, high visibility which enables high-quality images to be visually recognized including the periphery of the images even when the user's sight line moves, and wearability based on miniaturization, are improved.

FIGS. 2A and 2B show simplified schematic diagrams of an example of the image display apparatus 102. The image display apparatus 102 includes a light source section emitting light, an illumination section 111, an image generation section 110 generating images and displaying images, and a lens 112 generating a virtual image of the image displayed by the image generation section. For example, the illumination section 111 may be configured by an LED and a diffusion light guide plate. Further, as the image generation section, a micro display may be used, such as a transmissive or reflective liquid crystal, and a digital mirror device (DMD). The light emitted from the lens 112 is incident on a user's eye 105 and is then incident on the inside of the eye from a pupil 115 so as to be focused on the retina. Thereby, the user can visually recognize the virtual image of the image generation section 110.

At this time, as shown in FIG. 2A, when light in a center section 113 of the light emitted by the lens is incident on the pupil 115, the user can visually recognize high-resolution images having less distortion, such as a virtual image 116. However, as shown in FIG. 2B, when the user's sight line is shifted, or when the head mounted display is not correctly positioned with respect to the user's pupil, light 114 in the area, in which the amount of aberration components is large, is incident on the pupil. As a result, the virtual image 116 visually recognize by the user becomes a blurred and distorted image, so that the quality of the image is deteriorated.

When the wearability, which is necessary for a wearable device, is to be achieved for the head mounted display, it is important to reduce the size and weight of the head mounted display. When a single lens configuration as shown in FIG. 2A and FIG. 2B is used, the optical system can be simplified, downsized, and reduced in costs. On the other hand, as described above, image deterioration due to aberration is caused in the periphery of the lens, which results in an unavoidable problem that the quality of images is deteriorated because, when the sight line moves or the like, a large amount of optical aberration components in the periphery of the lens are incident on the pupil.

Therefore, when the image display apparatus 102 is configured as shown in a simplified schematic diagram in FIGS. 3A and 3B, light in the peripheral area, including many optical aberration components, is suppressed from entering the pupil. Thereby, the head mounted display can be configured such that, even when the user's sight line moves, high-quality images can be visually recognized, including the periphery of the images.

FIG. 3A shows a simplified schematic diagram of an example of the image display apparatus in which a light-shielding band 117 as aperture restriction unit is provided in the periphery of the lens 112. The peripheral-area light 114 including many optical aberration components is suppressed from entering the pupil by the light-shielding band. Therefore, even when the user's sight line moves, only light 113 in the area closer to the center of the lens 112 enters the pupil 115, so that the high-quality images can be visually recognized, including the periphery of the high-quality images.

FIG. 3B shows an example in which no independent light-shielding band is provided, but the lens and the aperture restriction unit are integrated by restricting the diameter of the lens 112. In this configuration, the light incident area of the lens is restricted by the end surface portion of the lens incident surface. When the lens external shape is limited in order to restrict the generation of stray light due to the light reflection on the lens end surface 118, it is preferred that a sand rubbed surface is formed on the end surface, and the end surface is painted black, so that the reflection on the inner surface is restricted.

However, in the configuration in which the periphery is only simply shielded from light as shown in the configurations in FIGS. 3A and 3B, new problems as described below are caused, and hence, the light shielding width needs to be set in consideration of the amount of movement of the user's sight line. FIG. 4 and FIG. 5 each shows a simplified schematic diagram of an example of an image display apparatus provided with the light-shielding band 117 as aperture restriction unit. FIG. 4 is different from FIG. 3A and FIG. 3B in that FIG. 4 shows an optical path of light which is emitted from a pixel of the end of the screen of the image generation section 110 and enters the user's pupil 115. In FIG. 4, the sight line is directed to the front view axis direction. At this time, there is an area in which light 120 emitted from the pixel of the end of the screen of the illumination section 111 enters the user's pupil 115, and hence the user can visually recognize the screen, including the end of the screen. However, when the user's sight line moves as shown in FIG. 5, the light 120 emitted from the pixel of the end of the screen of the illumination section 111 does not enter the user's pupil 115. Therefore, the user cannot visually recognize the virtual image of the screen, including the end of the screen, which is a state in which a part of the screen cannot be visually recognized by the user.

Generally, in the projection section of the image display apparatus of the head mounted display, light passing through the center portion of the lens generally has a small aberration, and light passing through the peripheral portion has larger aberration components. Therefore, it is necessary that the aperture size of the aperture restriction unit is determined so that, while unnecessary periphery light is prevented from being transmitted to the pupil as much as possible, the range, in which the user' sight line frequently moves during working, is secured. Further, it is necessary that, within this range, the lens has an aspheric shape to suppress the aberration.

Therefore, here, the lens size is set as S when the aperture is restricted to the aperture size of the aperture restriction unit or by the outer shape of the lens formed by integrating the lens and the aperture restriction unit. Further, the air-converted length of the optical axis from the lens to the pupil is set as L. The size of the pupil is set as $\Phi$, and the angle with respect to the front visual axis direction of the light 120 emitted from the pixel at the end of the screen of the image generation section 110 is set as FOV. Further, the inclination angle of the visual axis due to the movement of the sight line is set as $\theta$, and the size of the eyeball 105 is set as D, and the amount of movement of the pupil center due to the movement of the sight line is set as $\Delta$. The above-described FOV is an amount corresponding to the field angle of the virtual image (half angle).

At this time, $\Delta$ can be expressed by expression (1).

$$\Delta = (D/2) \sin\theta \tag{1}$$

The size of the pupil, at the time when the sight line is directed to the horizontal or vertical direction of the front visual field before the sight line is inclined, is set as $\Phi P$, $\Phi P$ can be expressed by expression (2).

$$\Phi P = \Phi \times \cos\theta \tag{2}$$

When the light 120 emitted from the pixel at the end of the screen is projected to the horizontal or vertical direction of the front visual field before the sight line is inclined, the position at the end of the effective area is set as OE, and the position of the end portion of the pupil is set as PE. When OE is larger than PE, the light 120 emitted from the pixel at the end of the screen enters the user's pupil, so that the user can visually recognize the area of the screen, including the end of the screen. (In FIG. 5, the signs are defined on the assumption that the upward direction of the paper surface is set as the positive direction, and that the downward direction of the paper surface is set as the negative direction.)

Here, OE can be expressed by expression (3).

$$OE = S/2 - L \times \tan(FOV) \tag{3}$$

Next, PE can be expressed by expression (4).

$$PE = \Delta - \Phi P/2 \tag{4}$$

Therefore, when the aperture size S of the aperture restriction unit is set to satisfy the conditions of the following expression (5), the user can visually recognize the screen, including the end of the screen.

$$S/2 - L \times \tan(FOV) > \Delta - \Phi P/2 \tag{5}$$

When expression (5) is modified, the following expression (6) which the aperture size S may satisfy is obtained.

$$S > 2\Delta - \Phi P + 2L \times \tan(FOV) \tag{6}$$

As described in expression (6), the aperture size S is changed by the field angle FOV of the virtual image. Therefore, in the image display apparatus, since the aperture size S, which is necessary in each of the horizontal direction and the vertical direction of the virtual image, is changed, the aperture sizes S in the direction corresponding to the horizontally and vertically directions of the visual field may be made different from each other.

Here, expression (6) is further specifically described by using average numerical values of the eyeball size, and the like. The size of the average eyeball is set to 23 mm, and the pupil size is set to 3 to 4 mm, and the field angle of the area in good resolution in human vision is set to 20° to 30° (full angle), and it is assumed that the sight line moves in this range.

Therefore, in the head mounted display, in order that the screen can be visually recognized while the sight line moves, the aperture size S needs to be set between the narrow range in which the visual field moves without lack of the screen, that is, in which D=23 mm, $\Phi$=3 mm, and $\theta$=10°, and the wide range in which the range of the movement of visual field is preferentially made large, that is, in which D=23 mm, $\Phi$=3 mm, and $\theta$=15°. This condition is expressed by the following expression (7).

$$1.04 + 2L \times \tan(FOV) < S < 3.06 + 2L \times \tan(FOV) \tag{7}$$

When the aperture restriction unit having the aperture size S satisfying the range shown by expression (7) is provided, the lack of the screen is not caused even when the sight line moves, and also, light in the peripheral portion of the lens, the light having large aberration, is suppressed from entering the pupil. Thereby, the user can visually recognize high-quality images even when moving the sight line. This condition is established in the visual field in each of the horizontal and vertical directions.

Figure 6:
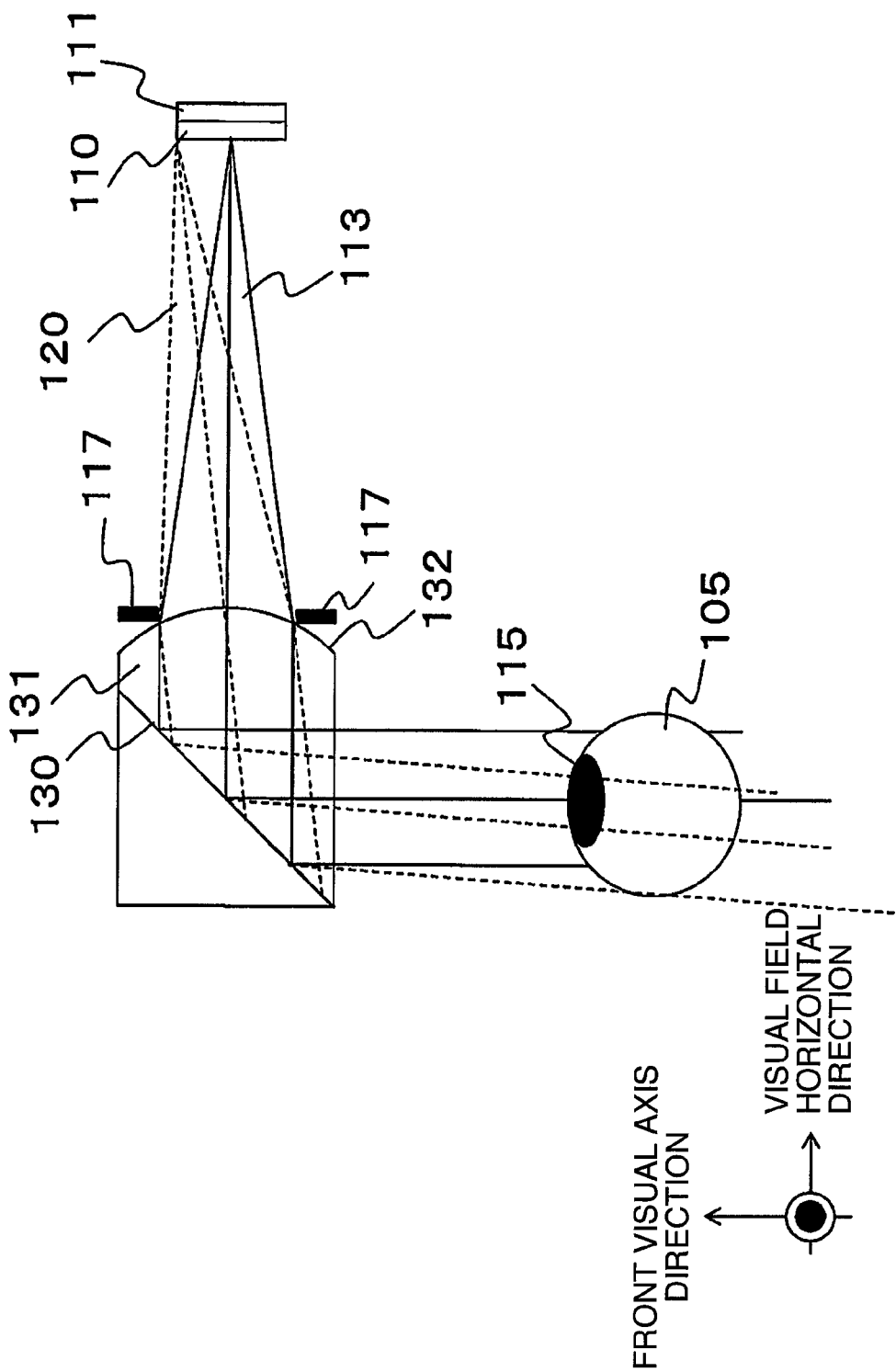
FIG. 6 is a schematic view of an image display apparatus using a prism lens.

Next, examples of various configurations of image display apparatuses will be described. FIG. 6 shows a schematic view of an image display apparatus using a prism lens. The image display apparatus is configured such that a reflecting surface for bending the optical path is provided in front of the pupil, so that light is projected in the lateral direction of the user's face. Thereby, the wearability of the image display apparatus is improved. Specifically, the image display apparatus may be configured such that a prism lens 131 is provided with a half mirror film 130, and an incident surface 132 is provided with the same lens function as that of the lens 112 and integrated with the prism section. Light, which passes through the aperture restriction unit 117 and the incident surface 132, is bent by the half mirror film 130, so as to enter the user's pupil. Further, since the reflection film of the prism is made of a half mirror film, the external world can be visually recognized through the prism, and thereby, the image display apparatus of the head mounted display can be provided with a see-through property.

The aperture size of the aperture limiting unit is set as S, and the size of the pupil is set as $\Phi$. The front visual axis direction angle of the light 120, which is emitted from the pixel of the end of the screen of the image generation section 110, is set as FOV, and the inclination angle of the visual axis when the sight line moves is set as $\theta$. In this case, it may be considered that the eyeball size D is the same as that of the portion described by using FIG. 5.

However, the optical axis length L is the length from the prism lens incident surface 132 to the pupil 115. The distance from the pupil to the prism is set as LE, and the length of the optical axis length portion, which passes through the inside of the prism, is set as L'. The length of the optical axis length portion, which length is converted into the optical axis length in the air by using a prism refractive index n, is expressed as L'/n, and hence, the sum of the LE and the length of L'/n may be set as the optical axis length L. By using these, the aperture size S is determined so as to be within the range in expression (7).

Figure 7:
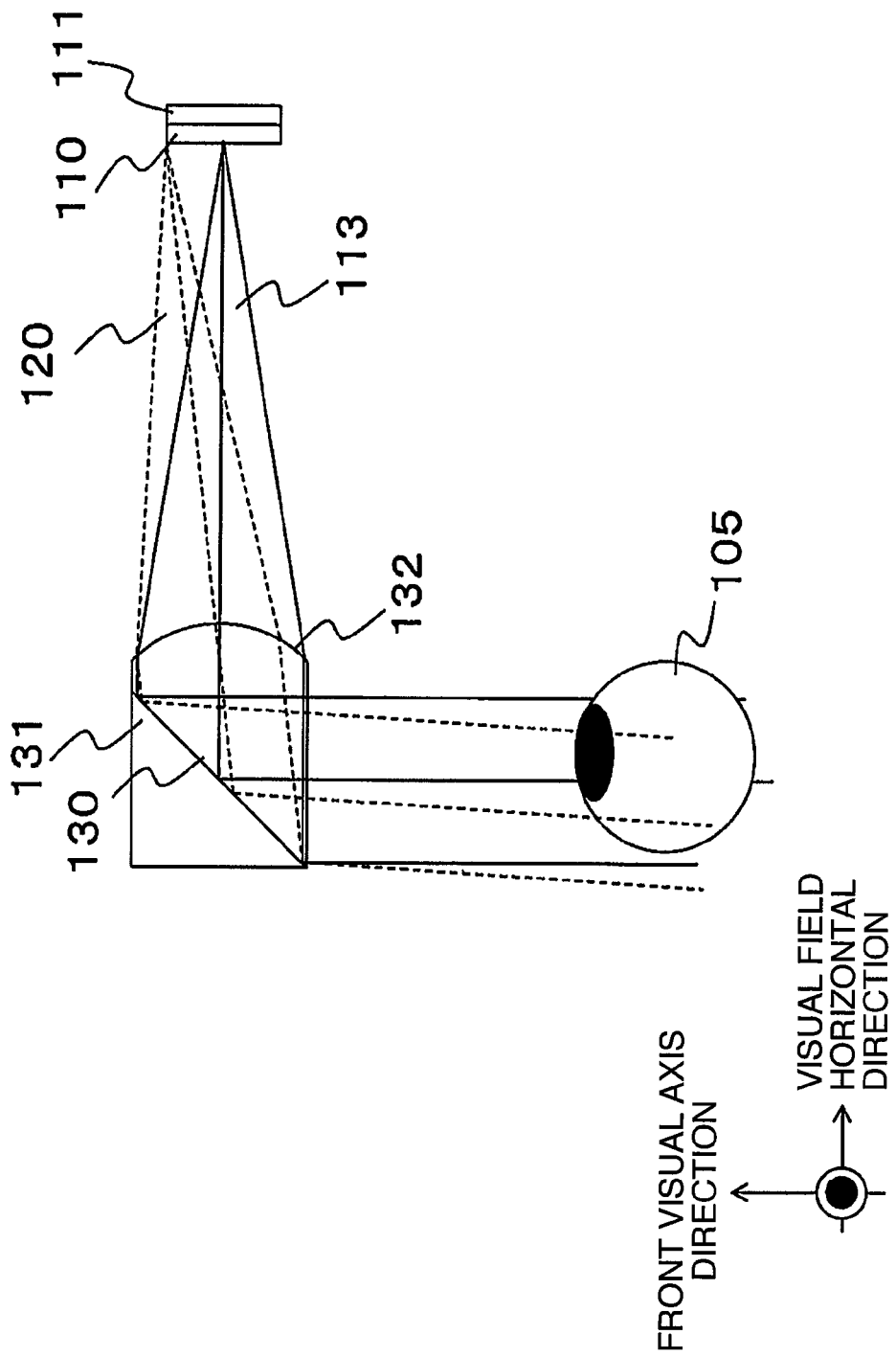
FIG. 7 is a schematic view of an image display apparatus in which aperture restriction unit and a prism lens are integrated into one.

FIG. 7 is a schematic view of an image display apparatus using a prism lens in the case where the aperture restriction unit and the incident surface 132 of the prism lens 131 are integrated together. In FIG. 7, it is configured such that the area of light incident on the prism lens is restricted by the end surface portion of the incident surface of the prism lens. Since the lens and the aperture restriction unit are integrated together, it is only necessary to set the external shape size S of the lens to be within the range shown by expression (7). In the case where the external shape of the lens is restricted, in order to suppress the occurrence of stray light due to the reflection of light on the end surface of the prism lens, it may be preferred that the end surface is formed into a sand-rubbed surface, and is blacked to suppress the reflection on the inner surface. However, in order to maintain the see-through property, the end surface vertical to the front visual axis direction is formed as an optical mirror surface, and the end surface vertical to the direction vertical to the visual field is formed into a sand-rubbed face and is blacked. With the configuration of FIG. 7, since it is not necessary to independently provide aperture restriction unit, the cost can be reduced, and the occurrence of stray light can be suppressed.

Figure 8:
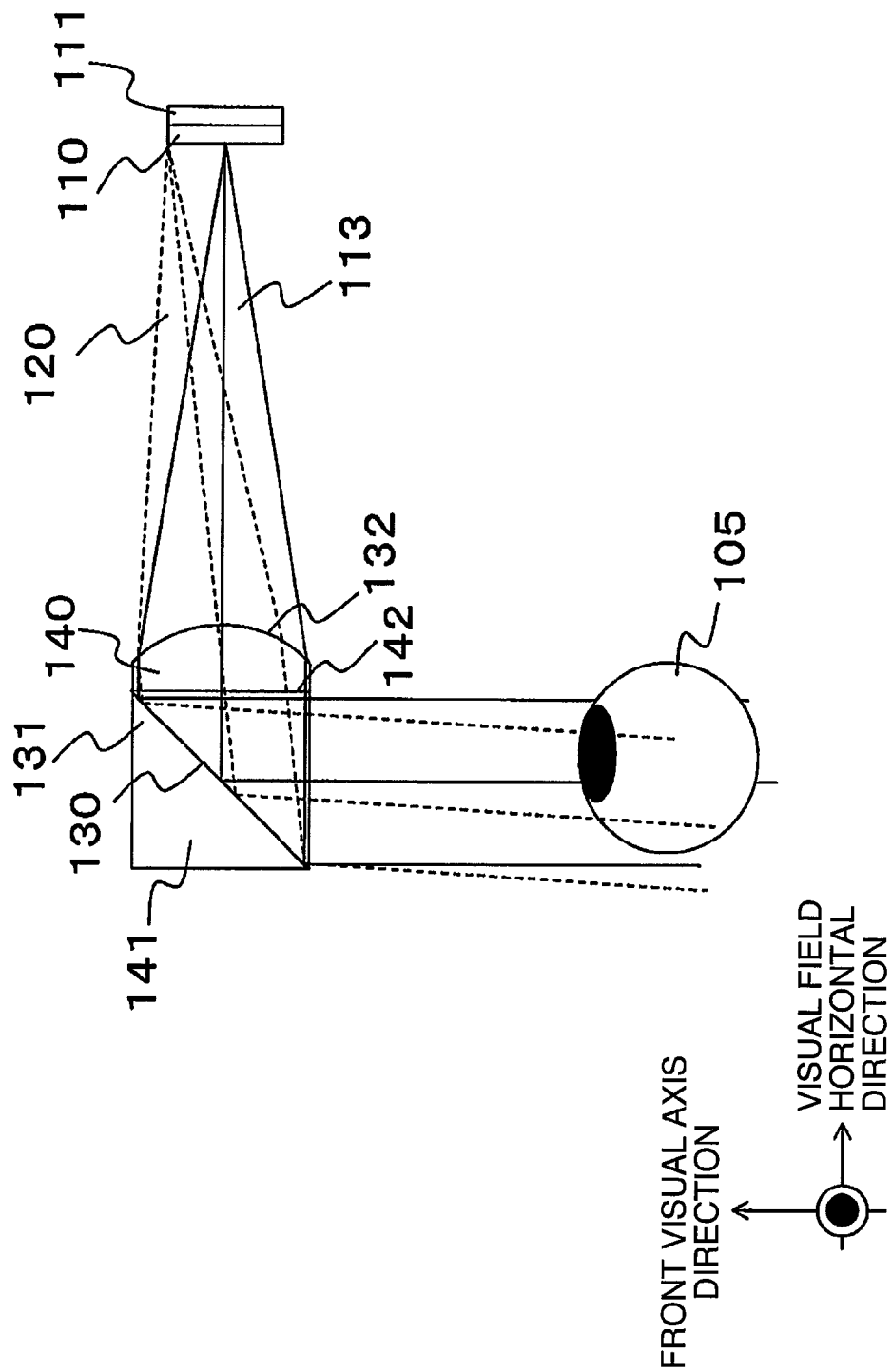
FIG. 8 is a schematic view of an image display apparatus using a prism lens configured such that a lens is transparently bonded to a cube prism.

FIG. 8 is a schematic view of an image display apparatus using a prism lens 131 configured in such a manner that a lens 140 and the cube prism 141 are transparently bonded to one another via a bonding surface 142. In this case, since the lens and the prism are not integrated together but are respectively separately produced and bonded to one another, it is possible to produce a prism lens even by using glass which has a complicated shape and which is difficult to be formed with high accuracy. The lens section may also be cut to have a square shape conforming to the outer shape of the prism. Since the prism lens is formed of glass, the change in characteristic due to temperature is suppressed, and hence, the reliability can be improved.

The same consideration can be applied to each of the optical systems shown in FIG. 6 to FIG. 8. In the systems, if the aperture size of the aperture restriction unit or the size S of the prism lens incident surface is determined to satisfy expression (7), images can be visually recognized even when the visual field moves, and further, unnecessary peripheral light is prevented from entering the pupil, so that the degradation of image can be suppressed.

In the following, there will be described general values of the optical axis length L and the field angle FOV in expression (7). First, the distance from the pupil to the prism, each forming an elements of the optical axis length L, is preferably set to about 20 mm to 25 mm in consideration of the case where the user wears glasses, or the like. In addition, the thickness on the optical axis in the prism lens is set to about 10 mm to 15 mm, and the refractive index of optical glass or plastic, which are supplied to the market in a large amount and low cost, is set to about 1.5. Therefore, generally, the optical axis length L is set to about 30 mm.

When the screen in the visual field is too small, displayed characters, and the like, are difficult to read. On the other hand, when the screen in the visual field is too large, the visual field is obstructed by the screen, and the image display apparatus itself becomes large, so that the wearability is impaired. Therefore, in general, the field angle FOV in the screen horizontal direction is set to 6° to 9° (FOV-H), and the field angle FOV in the screen vertical direction is set to 3° to 6° (FOV-V). The field angle FOV represents the half angle, and hence, in the whole visual field, a screen is displayed with the field angle twice the above value. Therefore, when L is set to 30 mm, and when the FOV is based on the above-described conditions, the value of 2L×Tan (FOV) in the horizontal direction is expressed by expression (8), and the value of 2L×Tan (FOV) in the vertical direction is expressed by expression (9).

$$6.31 < 2L \times \mathrm{Tan}\,(FOV\text{-}H) < 9.50 \quad (8)$$

$$3.14 < 2L \times \mathrm{Tan}\,(FOV\text{-}V) < 6.31 \quad (9)$$

When values of the ranges of expression (8) and expression (9) are substituted into expression (7), it is necessary that the aperture sizes S of the aperture restriction unit in the screen horizontal and vertical directions are respectively set in the ranges expressed by expression (10) and expression (11).

$$7.35 < S\,(\text{horizontal}) < 12.56 \quad (10)$$

$$4.18 < S\,(\text{vertical}) < 9.37 \quad (11)$$

As described above, in order to provide an image display apparatus which can display high-quality images including the periphery of the images even when the user's sight line moves, it may be such that, in the case where the aperture size of the aperture restriction unit is used, or in the case when the prism lens and the aperture restriction unit are integrated together, the size of the prism lens incident surface 132 is in the range given by expression (10) in the direction corresponding to the screen horizontal direction (front visual axis direction in FIG. 6 to FIG. 8), and the size of the prism lens incident surface 132 is in the range given by expression (11) in the direction corresponding to the screen vertical direction (visual field vertical direction in FIG. 6 to FIG. 8).

Further, in order to suppress the aberration of a light beam passing through the prism lens within the range of the aperture size, the shape of the prism lens incident surface 132 may be formed to have an aspheric shape. Especially, in a spherical lens, a periphery light beam is bent, by refraction, more than a light beam passing through the center section. In order to suppress this, it may be configured such that a surface shape of an aspheric convex lens is used as the lens surface shape of the prism lens incident surface 132 so that the curvature of the peripheral portion of the prism lens is smaller than the curvature of the center portion of the prism lens.

Further, it may be configured such that signal light is transmitted through the air between the emitting section which emits images generated by the image generation section, and the incident section 132 of the projection section, on which images emitted from the image generation section are incident. When the prism lens of the projection section is held by a support section (not shown) smaller than the vertical direction size of the visual field of the transparent prism lens, a structure and an optical member, which obstruct the user's visual field, can be suppressed, so that the see-through property can be improved.

As described above, the image display apparatus displays an image as a virtual image in the user's visual field, and the image display apparatus is configured by: the image generation section which generates an image, the illumination section which illuminates light to the image generation section; and the projection section which projects, as a virtual image, the image generated by the image generation section, to the inside of the user's visual field, and in that the projection section is provided with: the prism lens integrated, by predetermined unit, with the lens which generates a virtual image, and with the lens provided thereon with the half mirror film which bents, in the pupil direction, signal light from the image generation section; and the aperture restriction unit which is provided on the incident surface of the prism lens section, and through which light in a predetermined area of the signal light from the image generation section passes. With the image display apparatus, it is possible to provide a head mounted display which, even when the sight line moves, enables visual recognition of high quality images, and which has a see-through function and excellent usability.

Second Embodiment

Figure 9:
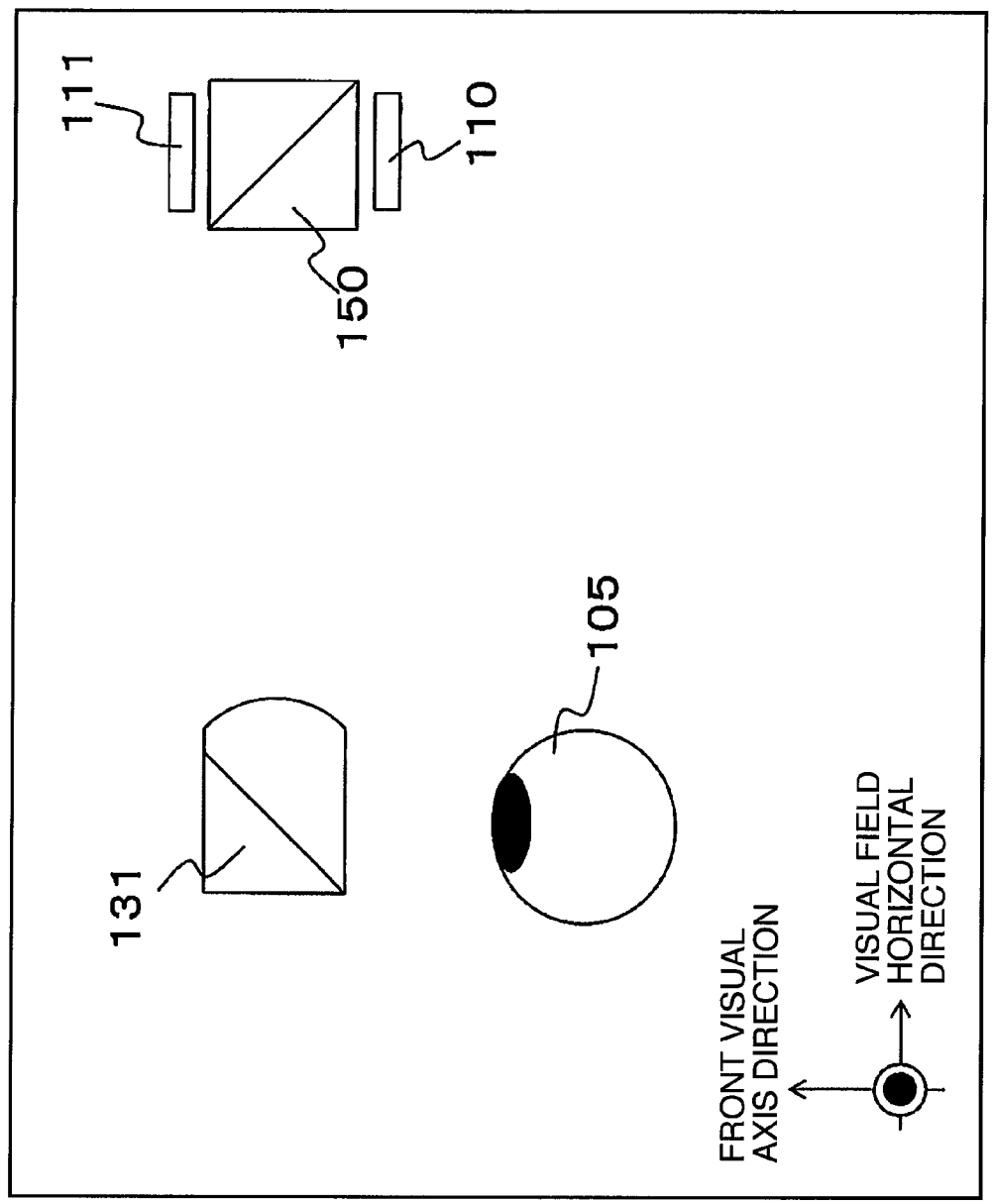
FIG. 9 is a schematic view of an optical system of an image display apparatus using a reflection type liquid crystal element.

A second embodiment will be described by using FIG. 9. In the above, the description has been made on the assumption that the image generation section 110 is a transmission-type liquid crystal. However, in the present embodiment, a reflection-type liquid crystal element is used as the image generation section 110. FIG. 9 shows a schematic view of an example of an optical system of an image display apparatus using the reflection-type liquid crystal element. When the reflection-type liquid crystal element is used, it may be configured such that illumination light from the illumination section 111 is separated from light incident on the pupil by using a polarization selection beam splitter 150. The configuration of the other portions of the image display apparatus are the same as those in the first embodiment. When the reflection-type liquid crystal element is used as the image generation section, it is possible to provide a head mounted display in which the utilization efficiency of light is increased, and which is power saving. Further, when the image generation section is provided with an image generating function, the image generation section may be modified into a micro display, such as a digital mirror device (DMD). These are a part of the examples and are not necessarily limited to the configuration provided with all the explained configurations.

When the image display apparatus configured as described above is mounted, it is possible to provide a head mounted display which, even when the sight line moves, enables visual recognition of high quality images, including the periphery thereof, and which is power saving and bright.

Third Embodiment

Figure 10:
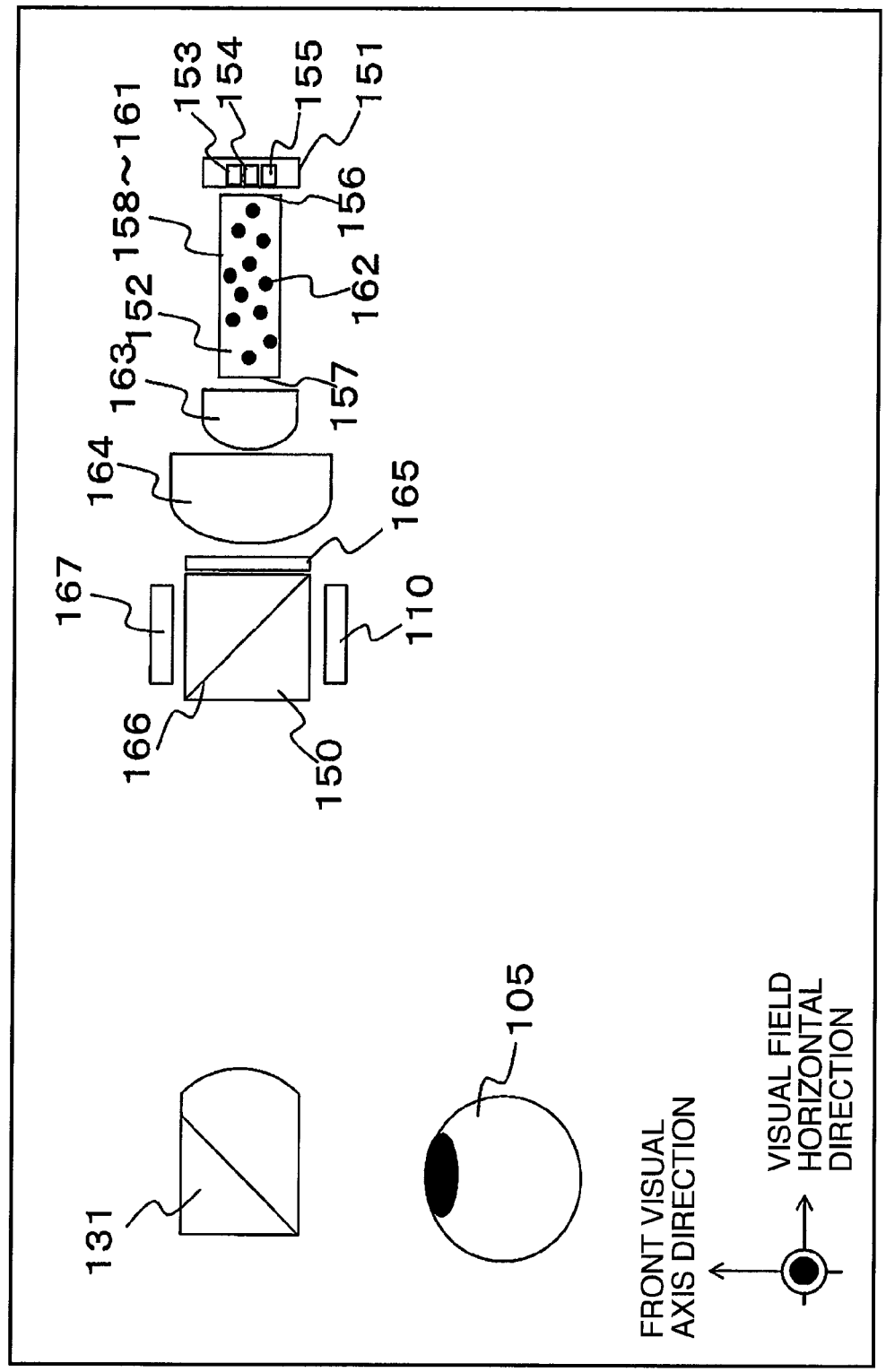
FIG. 10 is a schematic view of an image display apparatus using a multi-chip light source and a small optical integrator.

A third embodiment will be described by using FIG. 10. In the present embodiment, there is described an image display apparatus using a multi-chip light source 151 in which the image generation section is provided with a reflection-type liquid crystal, and in which a plurality of light sources are mounted to an illumination section, and a small optical integrator which improves color mixing property and homogeneity of light from the chip light sources. The configuration of the other portions of the image display apparatus are the same as those in the first embodiment.

In the image display apparatus of the head mounted display, when a field sequential color (hereinafter referred to as FSC) method, in which the color generation is performed by time-dividing three light source of red, green and blue, is used, three color light beams having high color mixing properties and homogeneity need to be illuminated to the image generation section mounted in the image display apparatus. Therefore, in order to miniaturize the illumination section of the image display apparatus, which section is provided with the multi-chip light source in which a plurality of light sources are mounted in a housing, the image display apparatus is provided with a small optical integrator 152 which improves the color mixing property and the homogeneity.

The light source 151 is a multi-chip light source in which a red chip 153, a green chip 154, and a blue chip 155, which are respectively emit light beams of red, green and blue wavelengths, are mounted in the housing. It should be noted that the arrangement of red, green and blue chips is not limited to the arrangement shown in FIG. 10, and may be changed freely.

The optical integrator 152 has a square pole-shape, and the inside of the optical integrator 152 is filled with a medium A having predetermined high transparency. Further, the optical integrator 152 includes incident-emitting surfaces 156 and 157, and TIR side surfaces 158 to 161.

Each of the incident-emitting surfaces 156 and 157 has a light incident surface or a light emitting surface.

It is known that, according to Snell's law, when a light beam with an incident angle larger than the critical angle is incident on a medium with a low refractive index from a medium with a high refractive index, the light beam is subjected to total internal reflection (hereinafter referred to as TIR). The TIR side surfaces 158 to 161 each has a function of confining, by TIR, the light incident from the incident-emitting surfaces 156 and 157.

The inside of the optical integrator 152 is randomly filled with scattering particles 162 each filled with a medium B which has a refractive index different from that of the medium A and which has high transparency. When a light beam passes through mediums having different refractive indices, the light beam is emitted at an angle different from the incident angle according to Snell's law. The scattering particle 162 has a function of scattering advancing light beams by changing the angles of the advancing light beams by using the principle. The scattering particle may have a spherical shape or other shapes.

The light emitted from the optical integrator 152 is condensed by condenser lenses 163 and 164, to pass through a polarizing film 165 which transmits light having a predetermined polarization direction, and then, enters a polarizing beam splitter 150. The light is reflected by a polarization selective reflective surface 166 in the polarizing beam splitter, and then, the polarization axis of the light is rotated by about 90° by a mirror 167 having a wavelength plate function and then is reflected. Then, the light again passes through the polarizing beam splitter 150, and then illuminates the image generation section 110. The virtual image of the image generation section 110, illuminated by the light from the optical integrator, is projected in the user's visual field by the eye prism 131 described in the first embodiment.

By using the optical integrator, light can be diffused while being confined, and hence, the colors of light from the multi-chip light source are efficiently mixed with one another and homogenized. Thereby, it is possible to provide a small and highly efficient illumination section 111 of the image display apparatus 102. Further, since the FSC type micro display is adopted in the image generation section, the color pixels of red, green and blue need not be respectively provided, and hence, the high resolution and high efficiency can be achieved.

As described above, the image display apparatus is configured such that the reflection-type liquid crystal is adopted in the image generation section, and is configured by using the multi-chip light source 151 in which a plurality of light sources are mounted in a housing in the illumination section, and the small optical integrator which improves the color mixing properties and homogeneity of light from the respective chip light sources. Thereby, there is an advantage that it is possible to provide a head mounted display which enables high-quality and high-resolution images to be visually recognized even when the sight line moves, and which is small and highly efficient and has a see-through function.

Fourth Embodiment

A fourth embodiment will be described by using FIG. 11. In the present embodiment, information can be shown as a high-contrast image when a head mounted display is used in outdoors.

Figure 11:
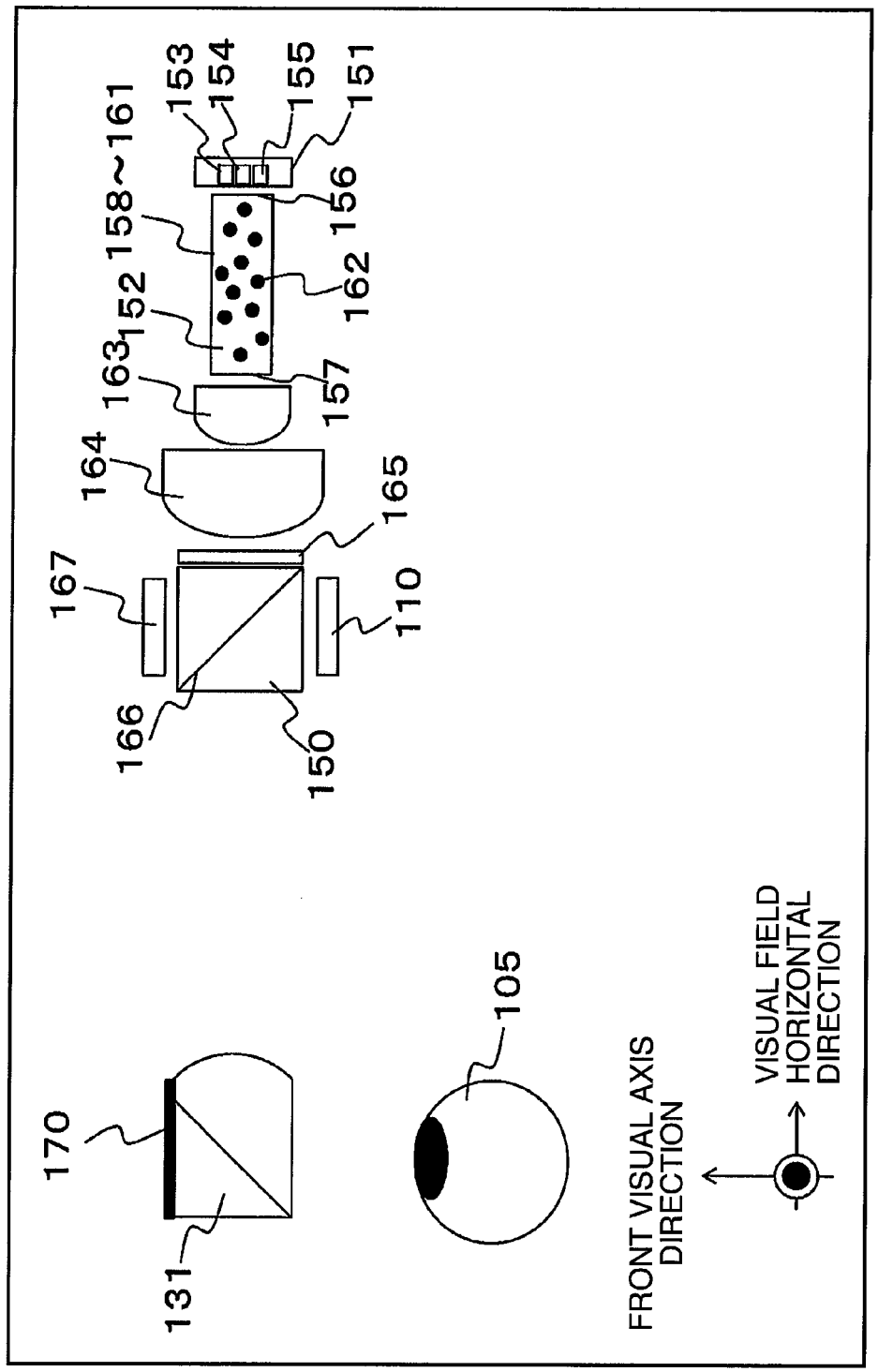
FIG. 11 is a schematic view of a configuration of an image display apparatus mounted with a dimming optical member layer.

FIG. 11 is a schematic view of a configuration of an image display apparatus mounted to the head mounted display in the present embodiment. In the configuration of the image display apparatus, the configuration, in which a virtual image is generated, is the same as the configuration described in the first embodiment. The present embodiment is different from the first embodiment in that a dimming optical member layer 170, which emits color in response to external light, is provided on the prism lens 131.

The dimming optical member may be an optical member having a dimming property (photochromic property) that the color is changed by sunlight or ultraviolet light. The dimming optical member has functions in which color light is emitted by the energy of ultraviolet light and the color light is faded by the energy of visible light or heat. Therefore, the dimming optical member is transparent in indoors, and cuts light, like sunglasses, when being exposed to strong ultraviolet light of sunlight in outsides.

Further, the dimming optical member layer 170 may be provided with an electronic light quantity adjusting mechanism using liquid crystal.

When the head mounted display having high see-through property is used in a very bright outdoor environment with sunlight, the brightness of the display screen becomes insufficient and is felt dark, so that the visibility is deteriorated. That is, the contrast of the display screen luminance with respect to the surrounding environment luminance is lowered. Therefore, the dimming optical member layer is provided in the direction vertical to the front-rear direction of the face of the clear optical block, and on the vertical surface side of the clear optical block, which is far from the user's pupil. Thereby, in outdoor environments exposed to strong sunlight, a fixed amount of light of the peripheral environment can be removed, so that the contrast of the display screen of the head mounted display can be enhanced to improve the visibility. When the indoor luminance is low, the dimming optical member layer becomes transparent by its dimming function, and hence, the see-through property is securable even in a low luminance environment. The above-described configuration has an advantage that a head mounted display, having high contrast and excellent visibility even in outdoors, can be provided.

Figure 12:
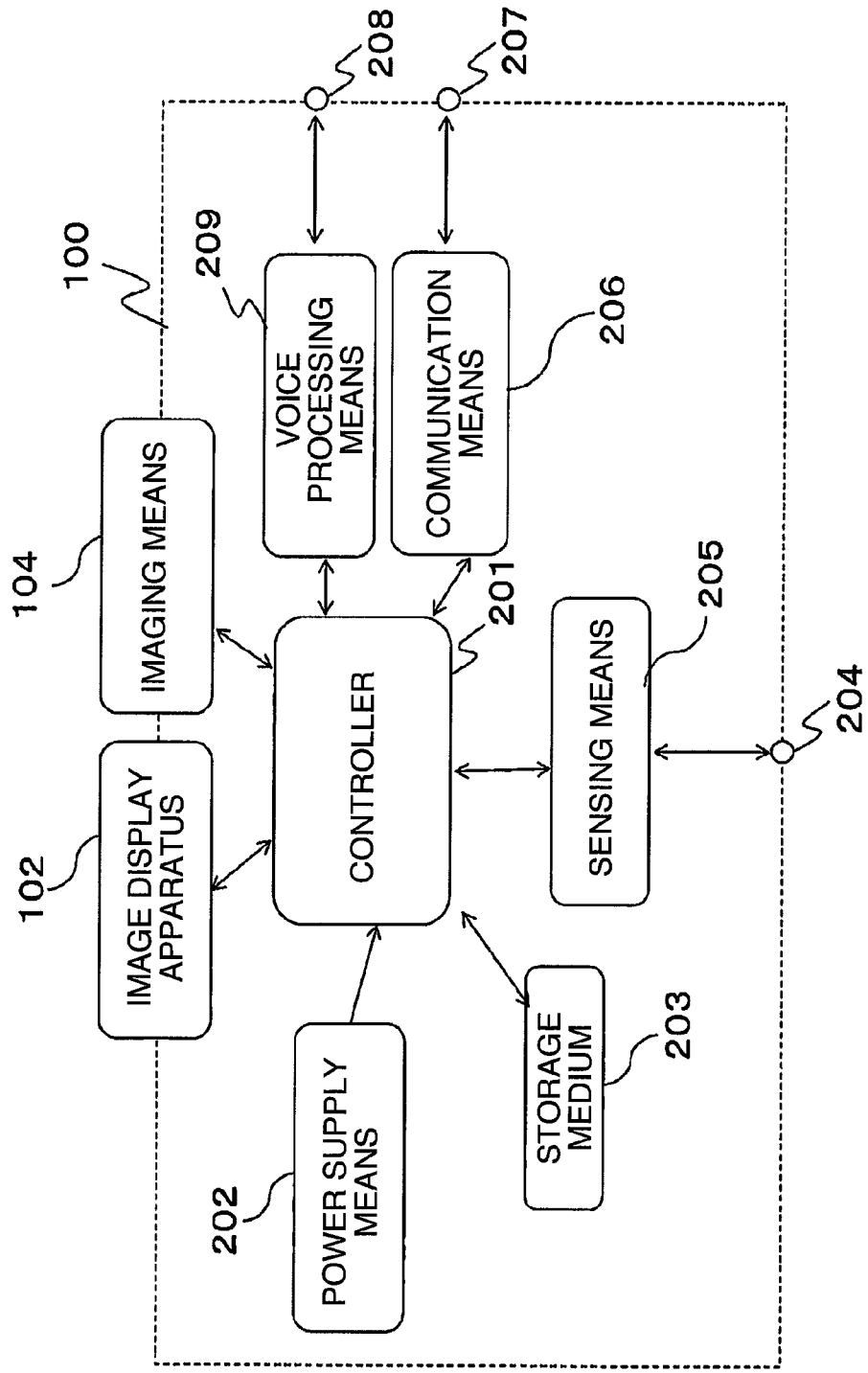
FIG. 12 is a schematic view showing an example of a block diagram of the head mounted display.

FIG. 12 is a schematic view showing an example of a block diagram of the head mounted display 100 in the first to fourth embodiments. Reference numeral 100 denotes the head mounted display, and reference numeral 201 denotes a control section which controls the head mounted display 100 as a whole. Reference numeral 104 denotes the imaging unit, and reference numeral 102 denotes the image display apparatus. Reference numeral 202 denotes power supply unit, and reference numeral 203 denotes storage medium. Reference numeral 204 denotes a sensor input/output section, and reference numeral 205 denotes sensing unit. Reference numeral 206 denotes communication unit, and reference numeral 207 denotes a communication input/output section. Reference numeral 208 denotes a voice input/output section corresponding to a microphone and an earphone, and reference numeral 209 denotes voice processing unit.

It should be noted that control lines and information lines, which are considered to be necessary for the description, are shown, and hence, all of the control lines and all of the information lines are not shown.

The communication unit 206 performs wireless communication with a network via the communication input/output section 207. For example, it is configured such that the head mounted display 100 is directly connected to a base station such as the Internet, to acquire information, or such that the head mounted display, provided with at least the imaging section and the display control section, communicates with an information terminal (smart phone, tablet type terminal, PC, or the like) accommodated in another housing, by short/long distance wireless communication, such as Bluetooth (registered trademark), Wifi (registered trademark), UHF, VHF, and the like, and the information terminal performs the connection with the Internet, or the like, and main processes.

Further, as the sensing unit 205, it is possible to mount a plurality of sensors including: sensors, such as an inclination sensor and an acceleration sensor, which can detect posture and orientation, movement of the user; sensors, such as a sight line sensor and a temperature sensor, which detect physical conditions of the user; a GPS sensor which detects the present position of the user; sensors, such as a pressure-sensitive sensor and an electrostatic capacity sensor, which are used as an input-output I/F for detecting the instruction input by the user; and a proximity sensor, and the like, which detects that the head mounted display is mounted or not by the user.

Figure 13:
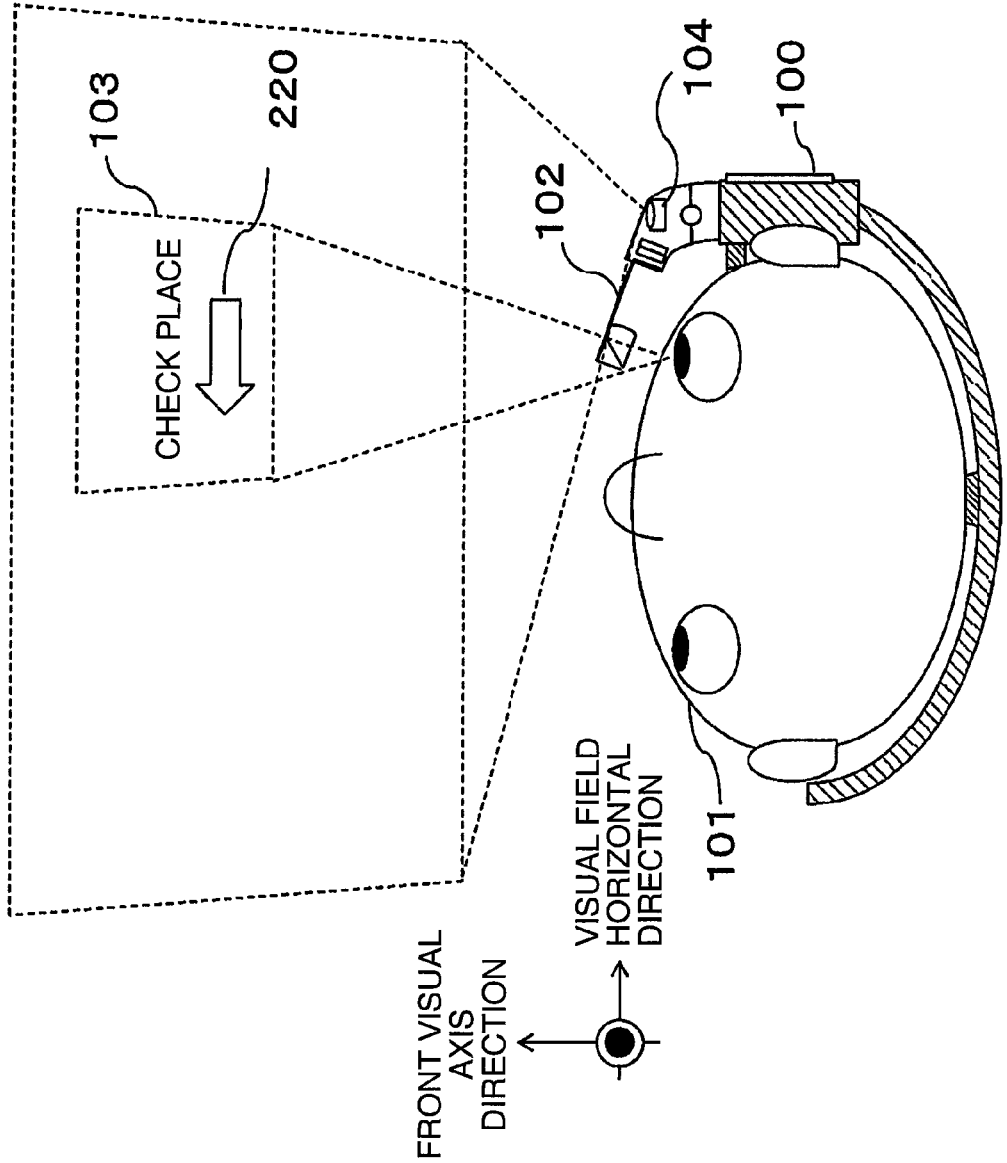
FIG. 13 is a schematic view showing a state of a work instruction function of the head mounted display.

FIG. 13 is a schematic view showing a state of a work instruction function of the head mounted display. In this state, the function can be implemented in such a manner that position information is acquired by the GPS sensor, and also the surrounding scenery is detected and recognized by the imaging device, and that, through the image display apparatus, for example, an arrow 220, or the like, providing guidance for pointing the check place in the visual field, can be displayed, for the user, as an augmented reality (AR) in the work such as maintenance inspection.

With the above-described configuration, it is possible to provide a head mounted display which is small and light weight, and has high mountability and portability, and which is further provided with a see-through function without obstructing the user's visual field and can performs high-quality image display.

In the above, the embodiments of the image display apparatus, and of the head mounted display using the image display apparatus, according to the present invention, are described, but the present invention is not limited to the above-described embodiments, and various variations are possible within the scope and spirit of the invention. That is, the embodiments described above have been described in detail so as to better illustrate the present invention and are not intended to be necessarily limited to include all the configurations described above. Further, a part of one of the embodiments described above can be replaced by a part of the configuration of the other embodiment, and also one of the embodiments described above can be additionally provided with a part of the configuration of the other embodiment. Further, for some of the configuration of each of the embodiments, the addition, deletion, and substitution of the configuration of the other embodiment are possible.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus which displays an image in a visual field of a user, the image display apparatus comprising:
   an image generation section configured to generate an image;
   an illumination section configured to illuminate light to the image generation section; and
   a projection section by which the image generated by the image generation section is projected, as a virtual image, to the visual field of the user, the projection section including:
      a prism lens formed by integrating a lens which generates the virtual image with a prism provided thereon with a half mirror film by which the virtual image from the lens is bent in the direction of a pupil; and
      an aperture restriction unit through which light in a predetermined area of the image from the image generation section passes, and the aperture restriction unit being disposed at the prism lens so that a light incident area of the prism lens is restricted.

2. The image display apparatus according to claim 1, wherein
   the aperture restriction unit a light-shielding band which is disposed at a lens incident surface portion of the prism lens to shield light.

3. The image display apparatus according to claim 1, wherein
   the aperture restriction unit is restricted by is disposed at an end surface portion of the lens incident surface of the prism lens, and
   the end surface portion of the prism lens includes a sand-rubbed surface and is blacked.

4. The image display apparatus according to claim 1, wherein
   the aperture restriction unit is disposed at an end surface portion of the incident surface of the prism lens,
   the end surface of the prism lens, arranged vertically to a vertical visual field, is a sand-rubbed surface and is blacked, and
   the end surface of the prism lens, arranged vertically to a visual axis direction, is an optical mirror surface.

5. The image display apparatus according to claim 1, wherein
   an aperture size S of the aperture restriction unit in a direction corresponding to a horizontal or vertical direction of a screen of the image generation section is in a range expressed by an expression:

$1.04 + 2L \times \tan(FOV) < S < 3.06 + 2L \tan(FOV)$, where FOV is a field angle in the horizontal or vertical direction of the screen, and an optical axis length from the lens to the pupil is set as L.

6. The image display apparatus according to claim 1, wherein
   an aperture size of the aperture restriction unit in a direction corresponding to a horizontal direction of a screen of the image generation section is in a range from 7.35 mm to 12.56 mm, and
   an aperture size of the aperture restriction unit in a direction corresponding to a vertical direction of the screen is in a range from 4.18 mm to 9.37 mm.

7. The image display apparatus according to claim 1, wherein
   an aperture size of an incident surface of the lens in a direction corresponding to a horizontal direction of a screen of the image generation section is in a range from 7.35 mm to 12.56 mm, and
   an aperture size of the incident surface of the lens in a direction corresponding to a vertical direction of the screen is in a range from 4.18 mm to 9.37 mm.

8. The image display apparatus according to claim 1, wherein
   the lens is a convex lens having an aspheric shape, and
   a curvature of a peripheral portion of the lens is smaller than a curvature of a center portion of the lens.

9. The image display apparatus according to claim 1, wherein
   the illumination section includes an optical integrator which diffuses the light,
   the optical integrator includes an incident surface on which the light is incident, an emission surface which emits the light, and a lateral surface which connects the incident surface to the emission surface,
   an inside portion of the optical integrator is filled with a light guide member made of a material having a predetermined refractive index,
   the light guide member includes a plurality of scattering particles which, between the incident surface and the emission surfaces, scatter the light propagating in the inside of the light guide member,
   the light propagates in a direction from the incident surface to the emission surface while being scattered in the inside of the light guide member, and
   at least a part of the scattered light is reflected by the side surface and is light-guided to the emission surface.

10. The image display apparatus according to claim 1, wherein
    the image generation section includes an emitting section which emits the image,
    the lens of the projection section is an incident section on which the image emitted from the image generation section is incident, and
    the image is transmitted through air between the emitting section of the image generation section and the lens of the projection section.

11. A head mounted display comprising:
    an image display apparatus including:
       an image generation section configured to generate an image;
       an illumination section configured to illuminate light to the image generation section; and
       a projection section by which the image generated by the image generation section is projected, as a virtual image, to the visual field of a user, the projection section including:
          a prism lens formed by integrating a lens which generates the virtual image with a prism provided thereon with a half mirror film by which the virtual image from the lens is bent in the direction of a pupil; and an aperture restriction unit through which light in a predetermined area of the image from the image generation section passes, and the aperture restriction unit being disposed at the prism lens so that a light incident area of the prism lens is restricted;

a camera which captures one or more photographs in a direction of a visual field of the user;

a power supply which supplies power to the head mounted display;

a storage medium for storing information including the photographs;

a sensing unit including one or more of an inclination sensor, an acceleration sensor, a sight line sensor, a temperature sensor, a GPS sensor, a pressure sensor, an electrostatic capacity sensor, and a proximity sensor;

a communication unit for communicating with an external apparatus;

a voice processing unit which outputs or inputs voice with a microphone or an earphone; and a control section which controls the image display apparatus, the camera, the storage medium, the sensing unit, the communication unit, and the voice processing unit, and the power supply.

* * * * *